United States Patent Office 3,331,771
Patented July 18, 1967

3,331,771
HOME WASTEWATER TREATMENT
Kenneth S. Watson and George E. Bennett, Louisville, Ky., assignors to General Electric Company, a corporation of New York
No Drawing. Filed May 24, 1965, Ser. No. 458,453
1 Claim. (Cl. 210—14)

The present invention relates to the treatment of domestic wastewater or sewage and is particularly concerned with the treatment of said wastewater to provide a supernatant or effluent water which is of better quality than that produced by presently known wastewater treatment processes.

The most generally used methods of treatment of wastewater from individual homes in practice today are limited by the flowing-through nature of the process. In other words, during periods of heavy discharge from the home the system effluent forced out of the system into the environment is not adequately treated. Copending application Ser. No. 374,573 filed June 12, 1964, in the names of Kenneth S. Watson, Robert P. Farrell and George E. Bennett and application Ser. No. 387,110 filed Aug. 3, 1964, in the names of Kenneth S. Watson and Robert P. Farrell, both assigned to the same assignee as the present invention, are concerned with a periodic discharge system which brings the process under positive control and thus all effluent before discharge will be assured of more adequate treatment. This application is concerned with a means of improving the flocculation and coagulation in activated sludge treatment processes and thus insuring the discharge of a better effluent. Although in a device treating only the waste from an individual home the possibility of forcing inadequately treated wastewater out of the system is more pronounced such action to a lesser degree also takes place in existing community systems so this application is structured to cover the community sized facility as well.

In flowing-through wastewater treatment systems under heavy hydraulic load the large volume of influent simply displaces an equal volume of effluent out of the fixed volume facilities thus reducing treatment time and tending to carry more solids out in the effluent. In the approach being proposed herein a flocculating agent or coagulant aid is added to activated sludge mixed liquor to improve the removal of solids, thereby improving the quality of the discharged effluent.

The present invention more specifically relates to and has as its primary object the provision of a home or domestic wastewater treatment method comprising (1) a period of bio-oxidation combined with (2) the use of a long chain, organic, water-soluble, cationic polymer (hereinafter referred to as a polyelectrolyte) in such a manner and time sequence as to produce a superior degree of clarification and stabilization of the treatment effluent.

Another object of the invention is to provide a process by which one of the basic steps in a classic wastewater treatment process, known generically as activated sludge treatment is made more effective and efficient so as to be able to produce a supernatant or effluent water of higher quality than is presently possible.

In accordance with the present invention, the polyelectrolyte treatment is applied to activated sludge mixed liquor, and not the raw domestic sewage hereinafter referred to a "wastewater." Mixed liquor is basically a different aqueous solution than the wastewater from which it is derived. Home wastewater is an extremely dilute aqueous solution made up of a wide variety of organic contaminant materials in a carrier water. The organic contaminant materials can include starches, carbohydrates, protein materials, free chemical radicals, etc. The existence, nature, variety and degree of the surface charges of the contaminant materials can and do vary over a wide spectrum. The contaminants themselves can be present in any of several physical forms (i.e., as suspended matter, floatable matter, colloidal matter, or in true solution).

When wastewater is mixed with a viable "activated" sludge for a period of time in an aerobic environment, an essentially *homogenous* liquor is formed. This occurs by virtue of the fact that the microorganisms which comprise the activated sludge can and do degrade the original contaminant materials in all forms; (dissolved, colloidal, or suspended) and utilize the molecular components in the synthesis of additional microorganisms. The original organic materials in the activated sludge process therefore serve as the substrate or food for the activated sludge microorganisms which make up the bulk of the resulting mixed liquor. The destruction of the original contaminant materials is complete and final, since the destruction is accomplished through an irreversible biological process. The overall conversion of wastewater into mixed liquor through the utilization of a period of mixing in an aerobic environment is herein termed bio-oxidation, and is the heart of the activated sludge process of wastewater stabilization.

The resulting activated sludge "mixed liquor" is a solids-liquid mixture. The liquid is water. The solids portion consists chiefly of microorganisms and their metabolic by-products, with only an extremely small fraction of the original organic waste materials remaining. In the bio-oxidation process, the microorganisms tend to agglomerate together into floc particles or "flocs." Since the original wastewater contaminants in the tank are the food upon which the microorganisms depend, the undestroyed waste materials also become incorporated into the floc particles. This is accomplished by means of the ability of the microorganisms to secrete extra-cellular enzymes for hydrolysis and size breakdown of the waste particulate matter, followed by the adsorption of the resulting smaller (supra colloidal) particulate matter upon the cell walls of the organisms. Since the great majority of the particulate matter in the activated sludge mixed liquor consists of microorganisms, the flocs which are formed also are made up essentially of microorganisms. The floc particles therefore tend to exhibit the characteristics of the microorganisms, even though the small remaining amount of the orginal waste materials present in the treating tank has also been caught up and become bound into the floc particles. That is, the floc particles for all practical purposes constitute a mass of bacterial cell tissue of a uniform and specific chemical make-up (on the general order of $C_5H_7O_2N$) with a predominant and more or less uniform net negative surface charge.

A further and important point is that coagulation as practiced in this invention results in the removal of organic materials which had been present in the original wastewater in a dissolved or soluble state. Addition of the polyelectrolyte coagulation directly to the original wastewater will not accomplish this. That is, the bio-oxidation of the raw wastewater *prior* to polyelectroylte coagulation is a new and unique concept, and has the result of producing an effluent water quality which is not attainable through the use of bio-oxidation alone, poly-electrolyte treatment alone, or any combination of the two except that which is taught by this invention.

As indicated above, the present invention involves the use of cationic polyelectrolyte coagulation in combination with the bio-oxidation process to produce supernatant or effluent waters consistently superior to that heretofore obtainable.

It is well recognized in the art that wastewater stabilization is a diminishing-returns type of process; that is, as the percent stabilization increases, more and more effort is required in order to achieve less and less. Thus if the original overall Suspended Solids reduction being obtained is on the order of 20%, increasing the degree of stabilization to 40% would not represent a very significant technical achievement. On the other hand, increasing the efficiency of a 90% efficient process by 5% (i.e., to 95%) constitutes a considerable accomplishment. One can appreciate the rationale of the above by considering that an effluent product by a 95% efficient process is twice as high in quality as an effluent produced by a 90% efficient process. For example, assume that a wastewater contains an original suspended solids concentration of 500 mg./l. It is a relatively simple matter to obtain 40% efficiency by removing 200 mg./l. of the original 500 mg./l. of contaminant particles. Or it is possible, through proper process control, to use bio-oxidation to remove up to 450 mg./l. of the original 500 mg./l. of particulate matter (90% efficient). As would be expected, the material most susceptible to aerobic digestion will be removed first, with the more resistant materials still relatively untouched. When 90% efficiency is achieved, only about 50 mg./l. of the original contaminant matter would remain in the wastewater and this would be the most difficult material to remove or stabilize. A process, such as the subject process, which increases the efficiency still further (to 95%) therefore halves the amount of contaminant material in the effluent, and produces an effluent twice as high in quality (i.e., from 50 mg./l. down to 25 mg./l. suspended solids). Also, the improvement is accomplished by removing the materials which are the most difficult to treat.

Inasmuch as the particular principles and ideas which comprise this invention involve clarification of activated sludge mixed liquor, it would appear that this invention can be applied to any or all of the modifications of the activated sludge process. That is to say that the invention is of technical value and can produce an improved supernatant or effluent water regardless of the size of the treatment system, so long as the activated sludge process or a modification of same is employed. In view of certain economic and practical considerations, however, this invention is particularly applicable to small-scale treatment systems utilizing the periodic discharge modification of the activated sludge process such as that carried out in the unit described and claimed in the copending application Ser. No. 374,573. The considerations referred to include the following:

(a) A higher coagulant cost per gallon of liquid treated can be tolerated.

(b) More efficient settling conditions (i.e., perfectly quiescent) can be provided.

(c) Optimum mixing and flocculation conditions can be more readily provided.

The process which is encompassed by this invention consists of the following sequence of operations.

*Step one.*—Raw, or pretreated, domestic wastewater is thoroughly mixed with a previously developed activated sludge culture.

*Step two.*—The activated sludge-wastewater mixture is then aerated for a sufficient length of time to effect (1) the microbial assimilation and subsequent biological conversion of the dissolved organic materials into cell tissue, and (2) the hydrolysis, assimilation and conversion of the biodegradable particulate organic matter into cell tissue. At this stage in the process, the dissimilar and widely-varying heterogenous mixture of organic pollutants, both soluble and insoluble, which were originally present in the wastewater have been to a large degree destroyed, and a mass of resultant solids of a homogenous nature, and with a relatively uniform and predictable negative surface charge, have been created. The solids-liquid mixture at this point is known as mixed liquor. The bio-aeration phase accomplishes a degree of actual destruction of the contaminant materials which is roughly proportional to the length of time involved, up to a minimum point. Therefore, this bio-aeration phase may be lengthened to accomplish an additional net destruction of organic materials over and above that required to release the energy required for synthesis. It should be noted that breakdown and conversion of both dissolved and particulate-colloidal organic matter is accomplished during the bio-oxidation process.

*Step three.*—After the original contaminant materials have been destroyed or transformed and the resulting homogeneous bio-solids mass, having a uniform negative surface charge, created; and when additional aeration, if provided, has produced the desired net destruction of organic material, a water-soluble, long-chain, high molecular weight, cationic polyelectrolyte material is introduced into the mixed liquor, that is, into activated sludge solids-carrier water mixture. This may be done either during or immediately after the completion of the bio-oxidation phase of the treatment. The polymer additive may be added to the mixed liquor while it is in the bio-oxidation chamber, or after transfer to a separate vessel or chamber.

*Step four.*—The next step in the process is the dispersion of the polyelectrolyte throughout the mixture. This can be accomplished, in the same or a different chamber or tank by any means which will produce sufficient liquid movement, such as diffused air aeration, paddle mixing, or agitation by means of a properly designed series of baffles. In any case, sufficient liquid disturbance is achieved to effect complete dispersion of the polyelectrolyte additive. Continued gentle mixing after the dispersion has been accomplished serves to enhance the agglomeration of the particulate materials into floc particles of sufficient size and density to settle rapidly and completely.

*Step five.*—After the particulate material has been agglomerated into readily settleable floc particles, agitation is ceased, either by discontinuing the mixing means (diffused air, paddle flocculation, etc.) or by transferring the polyelectrolyte-treated mixed liquor to a separate chamber where quiescent conditions exist. When quiescent settling conditions have been established, rapid and complete settling of the bio-solids will occur, the resulting accumulation of solids in the bottom of the tank being known in the art as sludge or settled solids.

*Step six.*—The final step in the process is the discharge or release of the clarified, solids-free carrier water which comprises the supernatant liquid at the end of the quiescent settling phase of the treatment, and the re-mixing and re-aeration of the settled solids so that they may be used again in the bio-oxidation phase as the procedure described is repeated.

One specific method of accomplishing the process of this invention is through the use of a single vessel which is used as both a bio-reaction chamber and as a settling chamber in such manner as to discharge clarified effluent periodically in sizable volumes, in the manner described by aforementioned application Ser. No. 374,573 of Watson, Farrell and Bennett. This method, which is most applicable to a home-sized wastewater treatment device, consists of the following sequence of treatment:

(1) Raw sewage as generated in the home is introduced into the reaction tank, which is initially at the minimum liquid level and contains activated sludge solids retained from the previous treatment cycle. The raw sewage-activated sludge mixture is aerated continuously over the period of time required for the liquid level to reach a predetermined maximum level, due to the accumulation of raw wastewater.

(2) When the predetermined maximum liquid level has been reached, the inflow of additional raw wastewater is terminated, and the mixed liquor is aerated for a period of time which is sufficient to allow the bio-oxidation activity to cause the objectionable organic material to be either assimilated into, or adsorbed upon, the activated sludge solids.

(3) During the later portion of the bio-oxidation treatment phase, a long chain, high molecular weight, cationic organic polymer material is added to the mixed liquor, allowing the air diffusion in the tank to effect the desired degree of mixing and thereby promote solids agglomeration and flocculation.

(4) The air supply is then shut off, which in effect converts the vessel into a settling chamber that provides absolutely quiescent conditions. The solid material separates very rapidly and completely from the carrier water, producing a supernatant liquid containing little or no particulate contaminant material and only a minimum amount of dissolved organic matter.

(5) The clarified and stabilized supernatant liquid is then discharged and air is supplied to the tank, which at this point is again at its minimum liquid level. This constitutes the end of a complete cycle of operation, and the unit is now ready to receive raw wastewater discharge again with the above sequence of operation repeated for the next cycle.

For larger wastewater volumes the sequence of operation is generally similar to the above example, except that the different operations may be accomplished in separate chambers.

Various well known cationic polyelectrolyte polymers can be employed. General examples thereof are the polymers of amino-alkyl acrylamides, aminoalkylacrylates, vinylpyridine, various diallylamines or copolymers thereof with various monomers such as styrene, ethylene, propylene, acrylonitrile, methylacrylate, etc.

Relatively wide ranges of polyelectrolyte dosage, mixing time, or bio-oxidation time appear to be useful. Results indicate that the commercially aminated organic polyelectrolyte available from the Dow Chemical Company under the trade designation Dow C31 always produces an improved quality of supernatant liquid when a concentration of 25 mg. per liter of mixed liquor is used. However, in certain instances other dosages (both greater than and less than 25 mg./l.) have produced a supernatant quality even better than that produced by a 25 mg./l. dosage. On the other hand, a 25 mg./l. dosage usually produces the best supernatant for any given mixed liquor. There are strong indications that too much, 100 mg./l. or so, of the polyelectrolyte can be used, in which case the treated supernatants are worse than "control" supernatants which receive no polyelectrolyte at all.

A similar situation has been found to exist with respect to the amount of mixing time employed (i.e., the amount of time which elapses after addition of the polyelectrolyte and prior to air shut-off in a periodic discharge system). A mix time of 3–7 minutes generally produces optimum clarification when a 1–3% solution of the Dow C31 in water is added. At mix times greater than 7 minutes some loss of clarification effectiveness has been observed, although excellent results have been obtained on occasion with mix times of up to 60 minutes.

As an indication of what can be accomplished through the use of this invention in actual home-sized equipment utilizing the periodic discharge modification of the activated sludge treatment process as described in the aforementioned Watson et al. application Ser. No. 374,573, results from a number of experimental runs will be summarized. In each of these experiments the polyelectrolyte polymer was Dow C31 added as described in Step 3.

*Example 1*

Subject liquor: Aerobic digestion mixed liquor (with MLSS [1] =5112 mg./l. and MLVS [2] =4290 mg./l.)
Quantity: 200 gallons.
Net concentration of polymer additive: 20 mg./liter.
Manner of mixing: Air diffusion.
Polyelectrolyte mixing time: 45 minutes.

TABLE 1

|  | Control | Using Polymer Additive | Percent Improvement |
|---|---|---|---|
| Chemical Oxygen Demand | 68 mg./l. | 48 mg./l. | 29.5 |
| Suspended Solids | 26 mg./l. | 2 mg./l. | 87.5 |
| Turbidity | 7.5 units | 1.75 units | 76.5 |
| Settling Time | 30 min. | 20 min. | 33 |

[1] MLSS means mixed liquor suspended solids.
[2] MLVS means mixed liquor volatile solids.

*Example 2*

Subject liquor: Aerobic digestion mixed liquor (with MLSS=2816 mg./l. and MLVS=2450 mg./l.).
Quantity: 200 gallons.
Net concentration of polymer additive: 20 mg./l.
Manner of mixing: Air diffusion.
PE mixing time: 10 minutes.

TABLE 2

|  | Control | Using Polymer Additive | Percent Improvement |
|---|---|---|---|
| Chemical Oxygen Demand | 87 mg./l. | 47 mg./l. | 46 |
| Suspended Solids | 18 mg./l. | 0 mg./l. | 100 |
| Turbidity | 7.5 units | 0.4 unit | 94.5 |
| Settling Time | 30 min. | 22 min. | 26.5 |

*Example 3*

Subject liquor: Activated sludge mixed liquor (with MLSS=3430 mg./l. and MLVS=2910 mg./l.)
Quantity: 167 gallons.
Concentration of polymer additive: 20 mg./l.
Manner of Mixing: Air diffusion.
PE mixing time: 6 minutes.

TABLE 3

|  | Control | Using Polymer Additive | Percent Improvement |
|---|---|---|---|
| Chemical Oxygen Demand | 60 mg./l. | 52 mg./l. | 13 |
| Suspended Solids | 6 mg./l. | 0 mg./l. | 100 |
| Turbidity | 4 units | 2 units | 50 |
| Settling Time | 35 min. | 20 min. | 43 |

*Example 4*

Subject liquor: Aerobic digestion mixed liquor (with MLSS=2930 mg./ and MLVS=2460 mg./l.).
Quantity: 221 gallons.
Net concentration of polymer additive: 20 mg./l.
Manner of mixing: Air diffusion.
PE mixing time: 27 minutes.

TABLE 4

|  | Control | Using Polymer Additive | Percent Improvement |
|---|---|---|---|
| Chemical Oxygen Demand | 48 mg./l. | 30 mg./l. | 37.5 |
| Suspended Solids | 12 mg./l. | 2 mg./l. | 83 |
| Turbidity | 7.5 units | 0.5 unit | 93 |
| Settling Time | 45 min. | 22 min. | 51 |

Example 5

Subject liquor: Activated sludge mixed liquor MLSS=4265 mg./l. and MLVS=3670 mg./l.).
Quantity: 167 gallons.
Net concentration of polymer additive: 19.8 mg./l.
Manner of mixing: Air diffusion.
PE mixing time: 18 minutes.

TABLE 5

|  | Control | Using Polymer Additive | Percent Improvement |
|---|---|---|---|
| Chemical Oxygen Demand | 94 mg./l. | 48 mg./l. | 49 |
| Suspended Solids | 36 mg./l. | 2 mg./l. | 94.5 |
| Turbidity | 19 units | 2 units | 89.5 |
| Settling Time | 39 min. | 20 min. | 48.5 |

It should be noted that the most significant improvement achieved through the use of the present invention is the overall improvement in the appearance of the effluent water. This improvement is evident from the decided reduction in suspended solids, ranging between 83% and 100% when compared to supernatant produced by settling mixed liquor to which no polyelectrolyte has been applied. A decided reduction in turbidity, which is another measure of the clarity of the supernatant, also takes place. It will be noted that the improvement in turbidity ranged between 50% and 94.5%. Both of these improvements are proof that the process of the present invention produces a clearer supernatant and a sludge that separates more completely than is obtained in conventional sewage treatment processes.

Also, the chemical oxygen demand (COD) is reduced by 13% to 46%, which is a further proof of the improvement in effluent quality. The reductions and improvements occurred in settling periods which were reduced by 26.5% to 51%, compared to the settling times for the control units in which no polymer was used.

The effectiveness of the present process in treating raw sewage as compared with known processes employing only the use of a polyelectrolyte coagulant or only the bio-oxidation (activated sludge) treatment is shown by the results set forth in the following table.

TABLE 6.—USE OF POLYELECTROLYTE ALONE

| Test No. | Chemical Oxygen Demand Reduction, Percent | SS Reduction, Percent |
|---|---|---|
| 1 | 51.1 | 33.0 |
| 2 | 65.8 | 42.8 |
| 3 | 68.9 | 44.9 |
| Average | 61.9 | 40.2 |

USE OF BIO-OXIDATION ALONE

| Test No. | Chemical Oxygen Demand Reduction, Percent | SS Reduction, Percent |
|---|---|---|
| 1 | 83.0 | 87.5 |
| 2 | 79.5 | 90.7 |
| 3 | 87.7 | 97.4 |
| 4 | 81.5 | 88.6 |
| 5 | 82.2 | 86.2 |
| Average | 82.8 | 90.1 |

USE OF PRESENT PROCESS

| Test No. | Chemical Oxygen Demand Reduction, Percent | SS Reduction, Percent |
|---|---|---|
| 1 | 88.0 | 99.0 |
| 2 | 89.0 | 100.0 |
| 3 | 89.0 | 100.0 |
| 4 | 88.5 | 98.1 |
| 5 | 90.0 | 99.2 |
| Average | 89.1 | 99.2 |

While there have been described specific embodiments of the present invention, it will be understood that it is not limited thereto and that it is intended by the appended claims to cover all such modifications as fall within the true spirit and scope of the invention.

What we claim as new and desire to secure by Letters Patent of the United States is:

The method of treating home raw wastewater intermittently discharged from a home to produce an effluent water of high quality which comprises the steps of:

(a) introducing said discharged wastewater into a reaction tank containing activated sludge solids from a previous aerobic treatment of raw wastewater and accumulating the discharged wastewater in said tank until the volume thereof reaches a predetermined maximum level, (b) continuously aerating the contents of said tank during the accumulation of raw wastewater to provide a continuous biochemical oxidation thereof, (c) when the level of accumulated wastewater in said tank reaches said predetermined maximum level, discontinuing the introduction of raw wastewater into said tank while continuing the aeration of the contents of said tank for a period of time sufficient to effect substantially complete microbial assimilation and biological conversion of organic materials in said wastewater into cell tissue, (d) adding to the contents of said tank a cationic polyelectrolyte while continuing the aeration of the contents of said tank for a period of time not exceeding about seven minutes to provide dispersion and mixing of the polyelectrolyte and to promote the agglomeration of suspended particles, (e) interrupting the aeration treatment to provide quiescent conditions for the separation and settling of particulate activated sludge matter, (f) discharging at least a major portion of the supernatant liquid from said tank, and (g) retaining at least a portion of the settled particulate activated sludge matter in said tank for treatment of wastewater thereafter discharged into said tank.

References Cited

UNITED STATES PATENTS 3,173,866   3/1965   Lefton et al. _____ 210—15 X

FOREIGN PATENTS 662,534   5/1963   Canada.

OTHER REFERENCES

Phelps, E. B., et al., A Laboratory Study of the Guggenheim Bio-Chemical Process, Sewage Works Journal, January 1942, vol. 14, pp. 104–120.

Porges, N., Dairy Wastes: Disposal by Balanced Biochemical Bio-Oxidation, an 8-page Reprint from Dairy Engineering, September and October 1958, The Leonard Hill Technical Group, Eden St., London.

MORRIS O. WOLK, *Primary Examiner.*

MICHAEL E. ROGERS, *Examiner.*